April 26, 1966   G. J. VAN HECKE ETAL   3,247,668
MULTIPLE STROKE RIVET INSTALLATION TOOL
Filed Nov. 4, 1964

INVENTORS.
George J. Van Hecke
Peter R. Chirco
BY
Harness, Dickey & Pierce
ATTORNEYS

United States Patent Office 3,247,668
Patented Apr. 26, 1966

3,247,668
MULTIPLE STROKE RIVET INSTALLATION TOOL
George J. Van Hecke, Detroit, and Peter R. Chirco, Utica, Mich., assignors to Huck Manufacturing Company, Detroit, Mich., a corporation of Michigan
Filed Nov. 4, 1964, Ser. No. 408,828
22 Claims. (Cl. 60—52)

This invention relates to tool assemblies for driving fasteners, and more particularly to a portable power supply for energizing tools for driving fasteners.

In the present invention, a new, novel and versatile power supply is provided for tools for setting fasteners in which the power supply can be utilized as an integral part of a tool assembly or can be used as a separate, portable power supply which can be carried by the operator at a position remote from the tool.

Therefore, it is an object of this invention to provide a novel tool assembly for setting fasteners.

It is a further object of the invention to provide a novel, versatile power supply for tools for setting fasteners.

It is a further object of the invention to provide a novel, versatile power supply which can be carried by the operator at a position remote from the tool.

The power supply of the present invention is of the type in which a reciprocating piston provides fluid under pressure for reciprocating a drive piston of the tool. In conventional power units for such tools the piston of the supply will make one, or less than one, complete stroke for each stroke of the piston of the tool. In the present invention the piston of the power supply is provided to reciprocate independently of the operation of the piston of the tool and is constructed to provine a multiple number of strokes for each stroke of the piston of the tool. Thus the required quantity of fluid will be provided by a number of strokes, hence permitting the piston, etc., of the supply of the present invention to be substantially smaller than pistons for conventional supplies for such tools. With such a construction the power supply can be more compact and lighter and permit and increase in the capacity of the tool assembly with a decrease in size; in addition, the lightweight, compact construction permits the power supply of the present invention to be readily portable.

It is a further object of this invention, then, to provide for a new, versatile power supply for tools for setting fasteners in which the construction lends itself to a more compact assembly.

It is another object of the present invention to provide a new and versatile power supply for tools for setting fasteners in which the piston of the power supply requires a number of strokes relative to a single actuating stroke of the piston of the tool.

Other objects, features, and advantages of the present invention will become apparent from the subsequent description and the appended claims, taken in conjunction with the accompanying drawing, in which:

Figure 1:
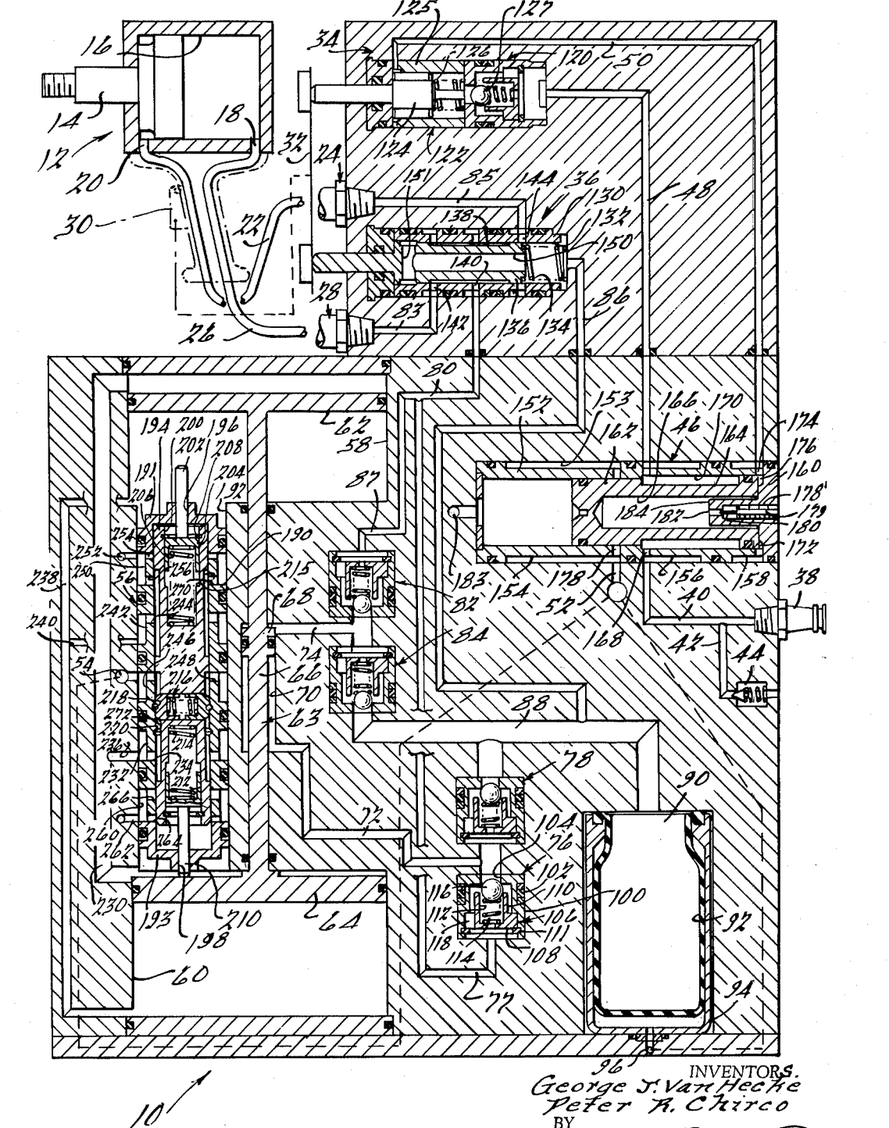
The drawing is a combination schematic and sectional presentation of a tool assembly including a tool and power supply embodying the features of the present invention with the tool shown in substantially reduced scale relative to the power supply.

Looking now to the drawing, a tool assembly for driving fasteners is shown and includes a power supply or intensifier assembly 10 for operating a tool generally shown and indicated by the numeral 12. In practice the components of the intensifier 10 would be mounted and located in a compact housing. For purposes of simplicity the intensifier 10 of the present invention has been shown in a uniplanar, partial schematic form since the specific details of assembly are not a part of the present invention and are within the knowledge of those skilled in the art.

In general, the power supply 10 can be considered as an air-to-hydraulic intensifier assembly and has a pneumatic and a hydraulic circuit, with the hydraulic circuit being pressurized by the actuation of the pneumatic circuit and with the pneumatic circuit being actuated from a source of pneumatic pressure which can be a standard air line. Thus the power supply 10 has a self-contained hydraulic system which provides an intensified hydraulic pressure output in response to the air input. The intensifier 10 is provided with a pair of pistons which are mounted in tandem. The tool 12, which can be any one of a number of hydraulically actuated tools well known in the art, is generally shown only, and is actuable from the hydraulic pressure from the intensifier 10 by way of conduit means which interconnect the tool 12 and the power supply 10.

Considering more specifically the details of the present invention, the tool 12 is provided with a drive piston 14, which is reciprocably mounted within a cylinder 16; one end of a passageway 18 communicates with the head end of piston 14 while one end of a passageway 20 communicates with the rod end.

The opposite ends of passageways 18 and 20 are connected to two hydraulic lines 26 and 22, respectively, which in turn are connected to the intensifier assembly 10 via hydraulic fittings 24 and 28, respectively. When the tool 12 is to be used remotely from the supply 10 the lines 22 and 26 will be in the form of flexible hydraulic lines; when the tool 12 is to be mounted directly to the supply 10 the lines 22 and 26 may be inflexible fluid paths. A trigger 30 is pivotally supported on the handle of the tool 12 and is connected to and cooperates with the intensifier assembly 10 such that when it is moved or depressed to one position, hydraulic fluid pressure is transmitted to the rod end of the cylinder 16 via the line 22 and the passageway 20 with fluid being returned from the head end of the cylinder 16 to the intensifier assembly 10 via the passageway 18 and line 26; by releasing the trigger 30 the intensifier assembly 10 is then connected to the tool 12 such that hydraulic fluid pressure is then transmitted to the line 26, through passageway 18 and to the head end of the cylinder 16 to return the piston 14 to its original position with the fluid being ejected from the rod end and returned to the intensifier assembly 10 via the passageway 20 and the fluid line 22. The interconnection between the trigger 30 and the intensifier 10 to accomplish the above actuation of the drive piston 14 will be more specifically described.

The trigger 30 is connected by cable or other suitable means to an actuating bar 32 which is movably mounted to the housing of the intensifier assembly 10 and which is utilized to control the actuation of an air throttle valve 34 and a hydraulic throttle valve 36.

In the condition of the throttle valves 34, 36 and other apparatus as shown in the drawing, the intensifier 10 is in an "off" condition. In order for the intensifier assembly 10 to be actuated, a source of pneumatic pressure is connected to an air connector 38 which communicates the source of pressure to the pneumatic circuit via an input passageway 40. The input passageway 40 is connected to atmosphere via a bypass passage 42 and a conventionally constructed check valve 44. The check valve 44 normally maintains the bypass passage 42 closed and is spring biased to open the passage 42 to atmosphere at a preselected pressure such that line pressures above a preselected magnitude applied to the air connector 38 will be bypassed to the atmosphere thereby protecting the intensifier assembly 10 from damage due to excessive air pressure.

The input passageway 40 passes through a bleed valve 46, in a manner to be later described, with the valve 46 in one position and is in communication with an inlet passageway 48 which communicates with one end of the air throttle valve 34. An outlet passageway 50 is connected to the air valve 34 which in the position as shown maintains the inlet and outlet passageways 48 and 50 out of communication with each other. Thus, in the latter position no air pressure is applied to the remainder of the intensifier assembly 10. Upon depressing the trigger 30 the actuating bar 32 is moved to a position in which the air throttle valve 34 is placed in its alternate condition in which the inlet passageway 48 is placed in communication with the outlet passageway 50. The outlet passageway 50 is interconnected with the bleed valve 46 and actuates that valve to its alternate condition, in a manner to be described, in which the input passageway 40 is placed in fluid communication with a main passageway 52.

The main passageway 52 is directly connected to a feed passage 54 (see dotted lines) with the feed passage 54 in turn being in communication with an air directional valve 56.

The air directional valve 56 is mounted between a pair of air cylinders 58 and 60 in which are reciprocably mounted a pair of air pistons 62 and 64, respectively. The pistons 62 and 64 are a part of a tandem piston assembly 63 and are connected together by a common rod structure 66. Intermediate the ends of the rod structure 66 is a hydraulic piston 68 which in turn is located in a hydraulic cylinder 70. Note that the air pistons 62, 64 are substantially larger than the hydraulic piston 68 such that pressure intensification takes place of the hydraulic fluid in hydraulic cylinder 70 as the result of reciprocation of the hydraulic piston 68 by the air pistons 62, 64.

The air directional valve 56 is reciprocated between two conditions by direct contact with the rod end of the cylinder heads 62 and 64 such as to cause air under pressure to be transmitted first to one side and then the other side of the air pistons 62 and 64 in the air cylinders 58 and 60, respectively. Thus with the air circuit thus far described in the position as shown upon actuation as previously described, air is moved into the head end of the cylinder 58 and to the rod end of the cylinder 60 to thereby cause movement of the tandem piston assembly 63, in a downward direction as shown in the drawing. When the assembly 63 reaches its lowermost position, the air directional valve 56 is shifted to its alternate position by means of its direct engagement with the underside of the piston head 62. With the air directional valve 56 in its alternate position air is then transmitted to the rod end of the cylinder 58 and head end of the cylinder 60 to cause movement of the tandem cylinder 63 upwardly again to the position as shown in the drawing. As will be seen, this reciprocation continues as long as the pressurized air is fed to the air directional valve 56 via the feed passage 54 and main passageway 52.

Thus actuation of the tandem piston assembly 63 is accomplished by means of the air circuit just described which actuation results in hydraulic pressure intensification in the hydraulic circuit of which the elongated cylinder 70 is a part. The hydraulic circuit of the intensifier assembly 10 is constructed such that hydraulic fluid flows under pressure for movement of the hydraulic piston head 68 in either direction. Thus, as the tandem piston assembly 63, and hence hydraulic piston 68, is moved downwardly, fluid from the bottom portion of the cylinder 70 is forced out under pressure through a hydraulic feed passageway 72 which is in communication with the lower end of the cylinder 70. As the tandem piston assembly 63 is moved upwardly, fluid is forced outwardly from 63 through a hydraulic feed passageway 74 which is in communication with the upper end of the hydraulic cylinder 70. The hydraulic feed passageway 72 is communicable with a pressure line 80 and a return line 86 via a pair of one-way check valves 76, 78 while feed passageway 74 is communicable with lines 80 and 86 via one-way check valves 82, 84. The feed passageway 72 is connected to the inlet end of check valve 76 which has its outlet end connected to pressure line 80 via an intermediate passageway 77 and is also connected to the outlet end of check valve 78 which has its inlet end connected to the return line 86 via an intermediate passageway 88. The intermediate passageway 88 is in communication with a pressurized reservoir 90 which includes a flexible bag 92 which is filled with hydraulic fluid and which is located in a rigid case 94 the interior of which is pressurized via a passageway 96 which is connected with the main passageway 52. Thus when the bleed valve 46 is actuated to its alternate position in which the main passageway 52 is pressurized the bag 92 will be externally pressurized thereby maintaining the hydraulic fluid therein at a selected low pressure. The reservoir 90 serves a purpose to be presently understood. The feed passageway 74 is connected to the inlet end of check valve 82 which has its outlet end connected to pressure line 80 via an intermediate passageway 87 and is also connected to the outlet end of check valve 84 which has its inlet end connected to the return line 86 via the intermediate passageway 88. Thus as the tandem piston assembly 63 is reciprocated, the hydraulic piston 68 with each stroke, forces pressurized hydraulic fluid into the pressure line 80 from one side of the hydraulic piston 68 and cylinder 70 with the opposite side of the hydraulic piston 68 and the cylinder 70 being refilled with hydraulic fluid from the return line 86 and the reservoir 90. For example, assuming the hydraulic piston 68 to be moving downwardly, as shown in the drawing, fluid is forced outwardly from the cylinder 70 under pressure via the feed passageway 72 through the check valve 76, the intermediate passageway 77 and into the pressure line 80; at the same time return fluid from the return line 86 is moved into the opposite side of the cylinder 70 via the intermediate passageway 88, the check valve 84 and the feed passageway 74. Likewise, on an upward movement of the hydraulic piston 68, fluid is forced out under pressure from the cylinder 70 through the feed passageway 74 through the check valve 82 to the intermediate passageway 87 and into the pressure line 80; at the same time fluid from the return line 86 is moved into the opposite side of the cylinder 70 via the intermediate passageway 88, the check valve 78 and the feed passageway 72.

With the tool 12 in the position as shown, the drive piston 14 is located in its normally deactuated position. To operate the tool 12, the trigger 30 is depressed, thereby depressing the actuating bar 32 to actuate the air throttle valve 34 and hydraulic throttle valve 36. The result of actuation of the air throttle valve 34 has heretofore been explained. By actuation of the hydraulic throttle valve 36, the pressure line 80 is placed in communication with a connecting line 85 which directly communicates the fitting 24 and the hydraulic throttle valve 36 in a manner to be described in more detail later. This fluid under pressure is transmitted into the rod end of the cylinder 16 to cause movement of the drive piston 14 rearwardly. At the same time fluid from the head end of the cylinder 16 is forced outwardly through the passageway 18 into the hydraulic fitting 28 and thence to the return line 86 via a connecting line 83 which connects the fitting 28 to the hydraulic throttle valve 36 in a manner to be described later. Note that any difference in the amount of fluid required to fill the cylinder 16 at the rod end of the drive piston 14 as compared to the amount evacuated from the cylinder 16 at the head end of the drive piston 14 is compensated for by means of the reservoir 90 which can accept any excess return fluid. As the drive piston 14 reaches the end of its stroke, i.e., at its rearwardmost position within the cylinder 16, the operation is finished and the trigger 30 can then be released by the operator. Upon releasing the trigger, the hydraulic throttle valve 36 is then permitted to return to its normal position as shown in the drawing, in which the pressure line 80 is now fluid-communicated to the connecting line 83 and the return line 86 is fluid-communicated to the connecting line 85. In this condition, fluid under pressure is then moved through the fitting 28 and into the head end of cylinder 16 causing the drive piston 14 to move to its foremost position with the rod end of cylinder 16 being communicated to the return line 86. Any extra fluid required to fill the head end of the cylinder 16 over that amount returned from the rod end is made up by the fluid in reservoir 90; the reservoir 90 also compensates for fluid loss through leakage.

It is important to note that as the trigger 30 is released both the hydraulic throttle valve 36 and the air throttle valve 34 are released to their normal positions. Note that in this position, as previously described, the air throttle valve 34 cuts off the supply of air to the bleed valve 46. If actuation of the intensifier 10 were ceased immediately upon release of trigger 30, the work piston 14 would not be returned to its original position; at this point then it will be recalled that the purpose of the bleed valve 46 was to maintain communication between the air line connected at the air connector 38 and the main passageway 52 for some preselected time interval after release of the trigger 30 and hence after return of the air throttle valve 34 to its original position. This is accomplished in a manner described in more detail later; however, for the present it is sufficient to understand that the bleed valve 46 is adjusted such as to maintain communication between the air connector 38 and the main passageway 52 for a time period of sufficient duration to permit continued actuation of the hydraulic circuit until the work piston 14 is returned to its original, foremost position in the cylinder 16.

Heretofore, the general operation of the intensifier assembly 10 and tool 12 have been described. The specific details of the various valves being left undescribed for the purposes of simplicity and understanding of the general concept of the present invention. The construction of the valves will be described as follows and will be the check valves 76, 78, 82, 84, the air throttle valve 34, the hydraulic throttle valve 36, the bleed valve 46 and the air directional valve 56.

*Check valves 76, 78, 82 and 84*

Since the check valves 76, 78, 82 and 84 are all alike, only the details of one, the check valve 76, will be described. The check valve 76 has a generally cup-shaped housing 100 which is mounted within a suitable opening and has located in its outer peripheral surface an annular seal assembly 102 for sealing between the cup 100 and the associated opening. The generally closed end of the cup 100 is provided with a through bore 104 which acts as a valve opening. A plug 106 is constructed with an enlarged, annular shoulder 108 which is located within a counterbore in the open end of the cup 100 and has a reduced diameter portion 110 located interiorly of and in clearance relation with the cup 100. The plug 106 is retained to the housing by a retainer ring 111. The plug 106 has a central bore 112 in which is located a coil spring member 114 which biases a ball check 116 into engagement with the wall of the edge of the valve opening 104 to thereby normally maintain it closed. The shoulder or annular flange 108 is provided with a series of grooves 118 whereby when the ball 116 is unseated from the aperture 104, fluid can flow around the reduced diameter portion 110 out through the apertures 118 and into the connecting passageway 77. The remainder of the check valves 78, 84 and 86 and 82, are constructed in like manner.

*Air throttle valve 34*

The air throttle valve 34 comprises a check valve 120 which is similar in construction to the check valve 76 previously described and will not be described here in detail. In conjunction therewith is provided an actuating assembly 122 which comprises a pin member 124 which is reciprocably mounted within a cylindrical housing 125 and is spring-biased outwardly by means of a spring 126 such as to be normally out of engagement with the associated ball member 127 of the check valve 120. The pin 124 extends outwardly beyond the housing of the intensifier assembly 10 and is engageable by the actuating bar 32 such that as the trigger 30 is depressed and hence as the bar 32 is moved toward the housing of the assembly 10, the pin member 124 is moved against the bias of spring 126 to unseat the ball 127 thereby opening the passageway through the check valve 120. The passageway 50 is connected to the housing 125 such that the passageway 50 is placed in communication with inlet passageway 48 upon unseating of ball 127.

*Hydraulic throttle valve 36*

The hydraulic throttle valve 36 comprises a cylindrical housing 130 which is provided with a central bore 132 having a coil spring 134 compressively located at one end thereof to urge a spool 136 outwardly therefrom. The outer end of the spool 136 extends beyond the housing of the assembly 10 and is in engagement with the actuating bar 32 such that upon depression of the trigger 30 and hence depression of the bar 32, the spool 136 is moved inwardly against the bias of the coil spring 134. The spool 136 is provided intermediate its ends with an elongated annular groove 138 which communicates the pressure line 80 and connecting line 83 via ports 140 and 142, respectively, in the housing 130 when the spool 136 is in its outermost position (as shown in the drawing). Thus, normally with the trigger 30 released and with the bar 32 in its outermost position, and hence simulating a condition either with the piston 14 in its forwardmost position or moving toward its forwardmost position, the pressure line 80 is in communication with the connecting line 83 whereby the high pressure side of the hydraulic circuit is communicated with the head end of the cylinder 16. In the same position as shown in the drawing, the connecting line 85 is in communication with the return line 86 via a port 144 in the housing 130 and the bore 132 such that fluid can be returned from the rod end of cylinder 16. The spool 136 is constructed such that as the rod 32 is depressed, hence moving the spool inwardly against the bias of the spring 134, bore 132 and return line 86 are placed in communication with the port 142 and connecting line 83 via a central axial bore 150 in the inner end of spool 136 and a radial cross port 151 which extends through the spool 136 and the bore 150; thus with the spool 136 in its inner position port 142 is placed into communication with cross port 151 in spool 136 and out of communication with port 140 in housing 130, whereby the return line 86 is communicated with the connecting line 83 and hence with the head end of cylinder 16. At the same time, with the spool 136 in its inner position, the port 144 is placed out of communication with the return line 86 and into communication with the pressure line 80 via the annular groove 138 whereby the pressure line 80 is communicated with the connecting line 85 and hence with the rod end of the cylinder 16 to cause movement of the piston 14 rearwardly.

*The bleed valve 46*

The bleed valve 46 has a cylindrical hollow body 152 located in a bore 153 and is provided with a first elongated annular groove 154 near its inner end, a second annular groove 156 intermediate its ends and a third annular groove 158 proximate its outer end. The housing 152 is secured within the bore 150 by means of a cap 160. Slidably located within the housing 152 is a spool 162. Spool 162 has an annular groove 164 near its outer end and has a central bore 166 extending partially therethrough from its outer end. With the valve 46 in the normally closed or "off" position, as shown in the drawing, the annular groove 164 is in communication with the input passageway 40 via groove 156 and a cross port 168. The same cross port 168 with the position of the spool 162 as shown, also communicates the input passageway 40 with the inlet passageway 48. The outer end of the housing 152 is provided with a counterbore 170 which is generally in line with the annular groove 164 in spool 162 with the spool 162 in its outer position. The spool 162 is provided at its outer end with a slightly enlarged shoulder portion 172 which rides within the counterbore 170. Thus with the air line connected to the air connector 38, air pressure is normally located within the space defined by the groove 164 and a counterbore 170 and hence will provide a force differential against the shoulder portion 172 forcing the spool 162 to its outer position, as shown in the drawing. The housing 152 is also provided with a cross port 174 which is in communication with groove 158 and which is normally maintained in communication with the outlet passageway 50 from the air throttle valve 34 such that upon actuation of the air throttle valve 34, air under pressure which has been transmitted to the outlet passageway 50, in the manner as previously described, is then transmitted to the very outer end of the spool 162. A slight recess 176 is provided between the outer end of the spool 162 and the cap 160 such that air pressure therein via cross port 174 will create a sufficient force in the spool 162 to overcome the holding force as the result of the air pressure in the cavity defined by the groove 164 and counterbore 170 to thereby move the spool 162 inwardly. With the spool 162 moved to its innermost position, the cross port 168 is placed in communication with another cross port 178 which is located in the outer end of the annular groove 154 via the annular groove 164. The main passageway 52 is in communication with the groove 154 and hence with the cross port 178 such that with the spool 162 in its innermost position the input passageway 40 is then placed in communication with the main passageway 52, thereby transmitting air to the air directional valve 56 through the feed passageway 54 in a manner as previously described. At the same time, of course, air through the air throttle valve 34 is still being maintained on the forward end of the spool 162 to maintain that element in its innermost position. At the same time air under pressure is likewise still being maintained on the inner surface of the enlarged shoulder portion 172 via the groove 164; however, the force differential on opposite sides of the spool 162 is such as to maintain it in its innermost position as long as the air throttle valve 34 is actuated.

Assuming that a fastener has now been set, the piston 14 of the tool 12 will be in its rearwardmost position within the cylinder 16; as the operator releases the trigger 30 the bar 32 is moved back to its normal position whereby the air throttle valve 34 and hydraulic throttle valve 36 are restored to their normal, original positions. In this position the hydraulic throttle valve 36 reverses the flow of fluid to the tool 12 to then pressurize the opposite side of the piston 14 to drive it to its original position shown in the drawing. However, upon deactuation of the air throttle valve 34, air pressure to the outlet passageway 50 is interrupted and hence the air pressure at the outer end of the spool 162 is removed. Thus there remains only the pressure on the shoulder portion 172 tending to move the spool 162 back to its original position. However, note at this time that the cavity or the volume defined by the outer end of spool 162 including the bore 166 and the housing 152 is initially filled with trapped air under pressure which prevents the spool 162 from returning to its outermost or original position. In other words the pressure applied to the inner end of the shoulder portion 172 via the second groove 156 and cross port 168 is not sufficient to move the spool 162 to its outermost position. Thus the communication between the input passageway 40 through the cross port 168 and the main passageway 52 via the cross port 178 and the annular groove 164 is still maintained even though the trigger 30 has been released and the bar 32 has returned to its normal position. The cap 160 is provided with a needle valve which comprises a threaded member 178', which has a tapered needle portion 180 located at its inner end. The threaded member 178' is located in a threaded bore and can be threaded inwardly or outwardly to move the needle portion 180 into or out of an aperture 182 which extends through an annular portion 184 which is located within the counterbore 170 and normally within the bore 166 in spool 162. The threaded portion of the member 178' is provided with a flat 179 whereby air within the cavity of the bleed valve assembly 46 can gradually escape to atmosphere via the aperture 182 and past the needle portion 180. The time required for this bleed-off can be set by moving the needle portion 180 more or less into the aperture 182 to thereby adjust the size of the restriction. In practice, this restriction would be provided to be such as to maintain the spool 162 in its innermost position until the tandem piston assembly 63 has undergone a number of cycles to pump a sufficient amount of fluid to tool 12 to return the drive piston to its original position. As the bleed-off continues and the air pressure and volume are reduced within the cavity of the bleed valve assembly 46, the air pressure applied to the inner side of the enlarged shoulder portion 172 will eventually become sufficient to move the spool 162 to its outermost position thereby covering the cross port 178 and breaking the communication between the main passageway 52 and the input passageway 40 whereby the application of pressure to the air directional valve 56 via the feed passage 54 is interrupted. The piston 14 of the tool 12 will then stop at its forward position and the spool 162 will be maintained in its outer position by means of the air line pressure at the input passageway 40. Note that the volume of the housing 152 behind the spool 162 is communicated to the atmosphere via a port 183 whereby air will not be trapped therein to insure that movement of spool 162 will not be impeded.

*Air directional valve 56*

The air directional valve 56 comprises a cylindrical housing 190 which is located within a bore 192 which extends between the cylinders 58 and 60. The sleeve 190 is fixedly mounted within the bore 192 and has located therein a movable or slidable spool 194. The opposite ends of the housing 190 and hence of bore 192 are enclosed by caps 191 and 193 which are provided with axial openings 196 and 198, respectively. The spool 194, at the end associated with the cylinder 58, is provided with a cavity or bore 200 in which is slidably located a pin member 202 which extends through the opening 196. The pin member 202 terminates at its inner end in an enlarged cuplike portion 204 in which is located a compressively biased coil spring 206 which urges the pin member 202 outwardly. The pin member 202 is mounted for reciprocable movement within the bore 200 with its movement restricted in the outermost direction by means of a snap ring 208. The opposite end of the housing 190 is similarly constructed and hence has a pin 210 located within a bore 212 and urged generally outwardly by means of a coil spring 214.

A ball detent assembly 216 is located within a radial through bore through the spool 194 and is provided to be movable between two positions as determined by a pair of axially spaced annular grooves 218 and 220.

The assembly noted thus far operates in the following manner. In the position shown, the pin 202 extends into the cylinder 58; as the tandem piston assembly 63 is moved in its opposite direction (downwardly) the underside of the piston head 62 engages the pin 202 moving it inwardly against the force of the spring 206 and additionally compresses the spring 206. The pin 202 is moved inwardly until the cup portion 204 engages a shoulder 215 in bore 200 and the entire spool 194 is moved inwardly with the ball detent assembly 216 being unseated from the first groove 218 and being moved toward the second groove 220. Once the ball detent assembly 216 has been unseated from the first groove 218, the energy stored in the compression spring 206 is sufficient to move the spool 194 to its second position with the ball detent assembly 216 located in the groove 220. With the above structure, if for some reason the power to the tandem piston assembly 63 should be discontinued at just that moment when the detent assembly 216 is unseated from the groove 218, the shifting of the spool 194 to its second position will still occur as a result of the stored energy in spring 206. In this condition the piston 64 is located in its lowermost position and the pin 210 extends into the cylinder 60 in much the same manner as does the pin 202 as shown in the drawing.

As the tandem piston assembly 63 is moved in its opposite direction (upwardly), the piston 64 engages the pin 210 and the reverse action occurs and the ball detent assembly 216 is unseated from the groove 220 and moved into the groove 218 and, hence, the spool 194 is shifted to its uppermost position, as shown in the drawing. It is the reciprocation of the spool 194 which causes the air pressure to be alternately shifted from one side of the pistons 62, 64 to the other. The latter is accomplished in conjunction with the reciprocation of the spool 194 by means of porting which is to be presently described.

The rod end of the cylinder 60 and the head end of the cylinder 58 are interconnected by means of a common passageway 230, which is in turn in communication with the annular groove 232 and a cross port 234 in the housing 190 by means of a connecting passageway 236. The rod end of the cylinder 58 and the head end of the cylinder 60 are likewise in communication with a common passageway 238 which is in turn connected by means of a connecting passageway 240 to an annular groove 242 and to a cross port 244 in the housing 190. The grooves 232 and 242 are located generally intermediate the ends of the housing 190 and have located therebetween another annular groove 246 which is in communication with a cross port 248 through the housing 190. The groove 246 is directly in communication with the feed passage 54. The end of the housing 190 proximate the groove 242 is provided with another groove 250 which is communicated with atmosphere via an exhaust passage 252. The groove 250 is also in communication with cross ports 254 and 256 through the housing 190. At the opposite end of the housing 190 is located another annular groove 260 which is also placed in communication with atmosphere via an exhaust passage 262 and which is likewise placed in communication with the interior of the housing 190 by means of cross ports 264 and 266.

The spool 194 is normally slidably, snugly located within the bore 192 of the housing 190 and has a first longitudinally extending outer annular groove 270 which is located at the pin 202 end of the spool 194. The air directional valve 56 in the position as shown has the groove 270 in communication with the port 244, hence communicating the connecting passageway 240 and the common passageway 238 to atmosphere by means of the passage 252. Hence, the head end of the cylinder 60 and the rod end of the cylinder 58 are placed in communication with the atmosphere to permit exhaust of the air therein.

The spool 194 is provided with a second annular groove 272, which is located at the opposite end of the spool 194, proximate of the pin 210, which in the condition of valve 56 as shown, communicates the cross port 248 with the cross port 234 thereby communicating the feed passageway 54 to the connecting passageway 236 and to the common passageway 230 and hence to the head end of the cylinder 58 and the rod end of the cylinder 60. With the directional valve 56 in the condition just described, the tandem cylinder assembly 63 is moved in a downward direction. As this downward movement of the cylinder assembly 63 occurs, air on the opposite sides of the pistons 62 and 64, respectively, is exhausted, in the manner as previously described.

Upon attainment of the end of the downward stroke of the tandem cylinder assembly 63, the spool assembly 194 is shifted downwardly to its alternate position in the manner as previously described. In this position the first annular groove 270 is out of communication with the port 256 and is in communication with the port 248 thereby placing the feed passageway 54 in communication with the port 244 whereby air pressure is transmitted to the rod end of the cylinder 58 and to the head end of the cylinder 60; this causes movement of the tandem cylinder assembly 63 in an opposite or upward direction. At the same time the annular groove 272 is out of communication with the port 248 and communicates the port 234 with the port 266, thereby placing the connecting passageway 236 in communication with the exhaust passageway 262 and hence communicating the common passageway 230, from the rod end of the cylinder 60 and the head end of the cylinder 58, with the atmosphere such that as the tandem piston assembly 63 is moved in its opposite direction, air can be exhausted from those ends of the cylinders 58 and 60.

Note that in the assembly shown, the pins 202 and 210 are substantially enclosed such as to be unaffected by the air pressure within the respective cylinders and hence to be affected substantially solely by the force of the pistons 62 and 64, respectively, thereon. In this regard, the caps 191 and 193 fit the ends of the spool 194 in clearance relation; the cross ports 254 an 264 communicate the interior of caps 191 and 193, respectively, to atmosphere in order to prevent any air from being trapped therein and impeding the reciprocation of the spool 194. Note also that caps 191 and 193 isolate the ends of the spool 194 from the pressure in the cylinders 58 and 60 and hence remove any possible influence this air pressure could have on the shift characteristics of the spool 194.

It can be appreciated, then, that reciprocation of the tandem piston assembly 63 will continue as long as the trigger 30 and hence the actuating bar 32 is in the depressed or actuated condition. An examination of the porting, etc., between the spool 194 and housing 190 will indicate that it is possible to place the valve 56 in a condition to stall the intensifier assembly 10 by locating the spool 194 intermediate the detent grooves 218, 220; however, the action of the springs 206 and 214 in causing positive shifting of the spool 194 assures that such a condition cannot be attained. Note that the air directional valve 56 is located in between the cylinders 58 and 60. This location provides for simplified valving and porting and also permits the construction of the intensifier assembly 10 to be more compact. As previously noted, the tool 12 is shown in substantially reduced scale relative to the intensifier assembly 10. Thus it can be seen that a substantial number of strokes of the tandem piston assembly 63 are required to pump the volume of fluid required by the cylinder 16 of tool 12. This permits the size of the pistons of the assembly 63 to be reduced to a minimum and permits the overall size of the intensifier assembly 10 to be reduced to a minimum whereby the intensifier assembly 10 can be readily portable.

Note that the bleed valve 46 is required for tools of the type described in order to insure return of the drive piston; however, for tools in which the drive piston is retained as by spring actuation the bleed valve 46 would not be required.

While it will be apparent that the preferred embodiment of the invention disclosed are well calculated to fulfill the objects above stated, it will be appreciated that the invention is susceptible to modification, variation and change without departing from the proper scope or fair meaning of the subjoined claims.

What is claimed is:

1. A tool assembly operable from a main source of fluid pressure comprising: a tool having a piston mounted in a cylinder for reciprocation in response to intensified fluid pressure in said cylinder on opposite sides of said piston; and power supply means connectible to the main source of fluid pressure for providing said intensified fluid pressure, said power supply means comprising reciprocating means actuable in response to the main source of fluid pressure for providing said intensified fluid pressure, actuating means selectively operable in one condition for connecting the main source of fluid pressure to said reciprocating means and in another condition for disconnecting the main source of fluid pressure from said reciprocating means, said actuating means including delay means for maintaining the main source of fluid pressure in communication with said reciprocating means for a preselected time interval after said actuating means has been placed into said other condition from said first condition, and means for connecting said reciprocating means for transmitting said intensified fluid pressure to said cylinder alternately on said opposite sides of said piston.

2. A tool assembly operable from a main source of fluid pressure comprising: a tool having a piston mounted in a cylinder for reciprocation in response to intensified fluid pressure in said cylinder on opposite sides of said piston; and power supply means connectible to the main source of fluid pressure for providing said intensified fluid pressure, said power supply means comprising reciprocating means actuable in response to the main source of fluid pressure for providing said intensified fluid pressure, actuating means selectively operable in one condition for connecting the main source of fluid pressure to said reciprocating means and in another condition for disconnecting the main source of fluid pressure from said reciprocating means, said actuating means including delay means for maintaining the main source of fluid pressure in communication with said reciprocating means for a preselected time interval after said actuating means has been placed into said other condition from said first condition, and means selectively operable with said actuating means for connecting said reciprocating means to said cylinder for transmitting said intensified fluid pressure to said cylinder on one side of said piston with said actuating means in said one condition and to said cylinder on the other side of said piston with said actuating means in said other condition.

3. A tool assembly operable from a main source of fluid pressure comprising: a tool having a piston mounted in a cylinder for reciprocation in response to intensified fluid pressure in said cylinder on opposite sides of said piston; and power supply means connectible to the main source of fluid pressure for providing said intensified fluid pressure, said power supply means comprising reciprocating means actuable in response to the main source of fluid pressure for providing said intensified fluid pressure, actuating means selectively operable in one condition for connecting the main source of fluid pressure to said reciprocating means and in another condition for disconnecting the main source of fluid pressure from said reciprocating means, said actuating means including delay means selectively adjustable for maintaining the main source of fluid pressure in communication with said reciprocating means for an adjustable preselected time interval after said actuating means has been placed into said other condition from said first condition, and means selectively operable with said actuating means for connecting said reciprocating means to said cylinder for transmitting said intensified fluid pressure to one side of said cylinder for driving said piston in one direction for performing a work operation with said actuating means in said one condition and for transmitting said intensified fluid pressure to the other side of said cylinder for driving said piston in an opposite direction for returning said piston after said work operation with said actuating means in said other condition.

4. A fluid power supply operable from a main source of fluid pressure comprising: reciprocating means actuable in response to the main source of fluid pressure for providing an intensified fluid pressure, and actuating means selectively operable in one condition for connecting the main source of fluid pressure to said reciprocating means and in another condition for disconnecting the main source of fluid pressure from said reciprocating means, said actuating means including delay means for maintaining the main source of fluid pressure in communication with said reciprocating means for a preselected time interval after said actuating means has been placed into said other condition from said first condition.

5. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a work piston and means for reciprocating said work piston a plurality of times for each stroke of said drive piston, actuating means selectively operable in one condition for connecting the main source of fluid pressure to said reciprocating means and in another condition for disconnecting the main source of fluid pressure from said reciprocating means, said actuating means including delay means for maintaining the main source of fluid pressure in communication with said reciprocating means for a preselected time interval after said actuating means has been placed into said other condition from said first condition, and means for connecting said reciprocating means for transmitting said intensified fluid pressure to said cylinder alternately on said opposite sides of said drive piston.

6. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a work piston and means for reciprocating said work piston a plurality of times for each stroke of said drive piston, actuating means selectively operable in one condition for connecting the main source of fluid pressure to said reciprocating means and in another condition for disconnecting the main source of fluid pressure from said reciprocating means, and means for connecting said reciprocating means for transmitting said intensified fluid pressure to said cylinder alternately on said opposite sides of said drive piston.

7. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a pair of pistons connected together with a common rod structure, a single piston supported on said rod intermediate said pair of piston, means for reciprocating said pair of pistons responsively to the main source of pressure, and means for obtaining said intensified fluid pressure from reciprocation of said single piston by said pair of pistons, actuating means selectively operable in one condition for connecting the main source of fluid pressure to said reciprocating means and in another condition for disconnecting the main source of fluid pressure from said reciprocating means, and means for connecting said reciprocating means for transmitting said intensified fluid pressure to said cylinder alternately on said opposite sides of said drive piston.

8. A fluid power supply operable from a main source of fluid pressure comprising: reciprocating means actuable in response to the main source of fluid pressure for providing intensified fluid pressure, said reciprocating means including a pair of pistons connected together with a common rod structure, a single piston supported on said rod intermediate said pair of pistons, means for reciprocating said pair of pistons responsively to the main source of pressure, means for obtaining said intensified fluid pressure from reciprocation of said single piston by said pair of pistons, and actuating means selectively operable in one condition for connecting the main source of fluid pressure to said reciprocating means and in another condition for disconnecting the main source of fluid pressure from said reciprocating means.

9. A fluid power supply operable from a main source of fluid pressure comprising: reciprocating means actuable in response to the main source of fluid pressure for providing intensified fluid pressure, said reciprocating means including a pair of pistons connected together with a common rod structure, a single piston supported on said rod intermediate said pair of pistons, means for reciprocating said pair of pistons responsively to the main source of pressure, means for obtaining said intensified fluid pressure from reciprocation of said single piston by said pair of pistons, and actuating means selectively operable in one condition for connecting the main source of fluid pressure to said reciprocating means and in another condition for disconnecting the main source of fluid pressure from said reciprocating means, said actuating means including delay means for maintaining the main source of fluid pressure in communication with said reciprocating means for a preselected time interval after said actuating means has been placed into said other condition from said first condition.

10. A fluid power supply operable from a main source of fluid pressure comprising: reciprocating means actuable in response to the main source of fluid pressure for providing intensified fluid pressure, said reciprocating means including a pair of pistons connected together with a common rod structure, means for reciprocating said pair of pistons responsively to the main source of pressure and including valve means located between said pair of pistons and alternately actuable by one of said pair of pistons to a first condition for fluid communicating one side of each of said pair of pistons to the main source of pressure and by the other of said pair of pistons to a second condition for fluid communicating the other side of said pair of pistons to the main source of pressure, and actuating means selectively operable in one condition for connecting the main source of fluid pressure to said reciprocating means and in another condition for disconnecting the main source of fluid pressure from said reciprocating means.

11. A fluid power supply operable from a main source of fluid pressure comprising: reciprocating means actuable in response to the main source of fluid pressure for providing intensified fluid pressure, said reciprocating means including a pair of pistons connected together with a common rod structure, a single piston supported on said rod intermediate said pair of pistons, means for reciprocating said pair of pistons responsively to the main source of pressure and including valve means located between said pair of pistons and alternately actuable by one of said pair of pistons to a first condition for fluid communicating one side of each of said pair of pistons to the main source of pressure and by the other of said pair of pistons to a second condition for fluid communicating the other side of said pair of pistons to the main source of pressure, and means for obtaining said intensified fluid pressure from reciprocation of said single piston by said pair of pistons, and actuating means selectively operable in one condition for connecting the main source of fluid pressure to said reciprocating means and in another condition for disconnecting the main source of fluid pressure from said reciprocating means.

12. A hydraulic power supply operable from a main source of air pressure comprising: reciprocating means actuable in response to the main source of air pressure for providing an intensified hydraulic pressure, actuating means selectively operable in one condition for connecting the main source of air pressure to said reciprocating means and in another condition for disconnecting the main source of air pressure from said reciprocating means, said actuating means including delay means for maintaining the main source of air pressure in communication with said reciprocating means for a preselected time interval after said actuating means has been placed into said other condition from said first condition.

13. A hydraulic power supply operable from a main source of air pressure comprising: reciprocating means actuable in response to the main source of air pressure for providing an intensified hydraulic pressure, actuating means selectively operable in one condition for connecting the main source of air pressure to said reciprocating means and in another condition for disconnecting the main source of air pressure from said reciprocating means, said actuating means including delay means for maintaining the main source of air pressure in communication with said reciprocating means for a pre-selected time interval after said actuating means has been placed into said other condition from said first condition, said delay means including an enclosed chamber, an orifice communicating said chamber with the atmosphere, means for selectively changing the size of said orifice for regulating the rate of air flow from said chamber, and means operable after said actuating means has been placed into said other condition from said first condition for interrupting the communication of the main source of air pressure with said reciprocating means responsively to the attainment of a preselected pressure in said chamber.

14. A tool assembly operable from a main source of air pressure comprising: a tool having a drive piston mounted in a cylinder for reciprocation in response to intensified hydraulic pressure in said cylinder on opposite sides of said drive piston; and power supply means connectible to the main source of air pressure for providing said intensified hydraulic pressure, said power supply means comprising reciprocating means actuable in response to the main source of air pressure for providing said intensified hydraulic pressure, said reprocating means including a work piston and means for reciprocating said work piston a plurality of times for each stroke of said drive piston, actuating means selectively operable in one condition for connecting the main source of air pressure to said reciprocating means and in another condition for disconnecting the main source of air pressure from said reciprocating means, and means for connecting said reciprocating means for transmitting said intensified hydraulic pressure to said cylinder alternately on said opposite sides of said drive piston.

15. A hydraulic power supply operable from a main source of air pressure comprising: reciprocating means actuable in response to the main source of air pressure for providing an intensified hydraulic pressure, an air throttle valve having a first inlet, a first outlet, and a first fluid path connecting said first inlet and first outlet, and first means in said first fluid path selectively actuable to one condition for opening said first fluid path and to another condition for closing said first fluid path, a bleed valve having a second and a third inlet, a second and a third outlet, a second fluid path connecting said second inlet and said second outlet, a third fluid path connecting said second inlet and said third outlet, and second means actuable responsively to air pressure from the main source at said third inlet for opening said third fluid path and with the air pressure from the main source removed from said third inlet actuable responsively to air pressure from the main source at said second inlet for closing said third fluid path, first fluid passage means for connecting said second outlet to said first inlet and for connecting said first outlet to said third inlet, second fluid passage means for connecting said second inlet to the main source, third fluid passage means for connecting said third outlet to said reciprocating means, said bleed valve including delay means for maintaining said third fluid path open for a preselected time interval after placing said air throttle valve into said other condition from said one condition whereby air pressure from the main source is maintained at said reciprocating means for said preselected time interval, said delay means including an enclosed chamber, said second means located in said second chamber, an orifice communicating said chamber with the atmosphere, means for selectively changing the size of said orifice for regulating the rate of air flow from said chamber with said second means being held from closing said third fluid path until the pressure in said chamber drops to a preselected magnitude.

16. A hydraulic power supply operable from a main source of air pressure comprising: reciprocating means actuable in response to the main source of air pressure for providing an intensified hydraulic pressure, said reciprocating means having a hydraulic output, hydraulic return, and an air input, an air throttle valve having a first inlet, a first outlet, a first fluid path connecting said first inlet and first outlet, and first means in said first fluid path selectively actuable to one condition for opening said first fluid path and to another condition for closing said first fluid path, a bleed valve having a second and a third inlet, a second and a third outlet, a second fluid path connecting said second inlet and said second outlet, a third fluid path connecting said second inlet and said third outlet, and second means actuable responsively to air pressure from the main source at said third inlet for opening said third fluid path and with the air pressure from the main source removed from said third inlet actuable responsively to air pressure from the main source at said second inlet for closing said third fluid path, first fluid passage means for connecting said second outlet to said first inlet and for connecting said first outlet to said third inlet, second fluid passage means for connecting said second inlet to the main source, third fluid passage means for connecting said third outlet to said air input of said reciprocating means, said bleed valve including delay means for maintaining said third fluid path open for a preselected time interval after placing said air throttle valve into said other condition from said one condition whereby air pressure from the main source is maintained at said reciprocating means for said preselected time interval, said delay means including an enclosed chamber, said second means located in said chamber, an orifice communicating said chamber with the atmosphere, means for selectively changing the size of said orifice for regulating the rate of air flow from said chamber with said second means being held from closing said third fluid path until the pressure in said chamber drops to a preselected magnitude, a hydraulic throttle valve having a fourth inlet, a fourth outlet, a first inlet-outlet, a second inlet-outlet, and means selectively actuable to one position for connecting said fourth inlet with said first inlet-outlet and said fourth outlet with said second inlet-outlet and to a second position for connecting said fourth inlet with said second inlet-outlet and said fourth outlet with said first inlet-outlet, and third fluid passage means connecting said hydraulic output from said reciprocating means to said fourth inlet and said hydraulic return of said reciprocating means to said fourth outlet.

17. A tool assembly operable from a main source of air pressure comprising: a tool having a piston mounted in a cylinder for reciprocation in response to intensified hydraulic pressure in said cylinder on opposite sides of said piston; and a hydraulic power supply operable from the main source of air pressure and comprising reciprocating means actuable in response to the main source of air pressure for providing said intensified hydraulic pressure, said reciprocating means having a hydraulic output, a hydraulic return, and an air input, an air throttle valve having a first inlet, a first outlet, and a first fluid path connecting said first inlet and first outlet, and first means in said first fluid path selectively actuable to one condition for opening said first fluid path and to another condition for closing said first fluid path, a bleed valve having a second and a third inlet, a second and a third outlet, a second fluid path connecting said second inlet and said second outlet, a third fluid path connecting said second inlet and said third outlet, and second means actuable responsively to air pressure from the main source at said third inlet for opening said third fluid path and with the air pressure from the main source removed from said third inlet actuable responsively to air pressure from the main source at said second inlet for closing said third fluid path, first fluid passage means for connecting said second outlet to said first inlet and for connecting said first outlet to said third inlet, second fluid passage means for connecting said second inlet to the main source, third fluid passage means for connecting said third outlet to said air input of said reciprocating means, said bleed valve including delay means for maintaining said third fluid path open for a preselected time interval after placing said air throttle valve into said other condition from said one condition whereby air pressure from the main source is maintained at said reciprocating means for said preselected time interval, said delay means including an enclosed chamber, said second means located in said chamber, an orifice communicating said chamber with the atmosphere, means for selectively changing the size of said orifice for regulating the rate of air flow from said chamber with said second means being held from closing said third fluid path until the pressure in said chamber drops to a preselected magnitude, a hydraulic throttle valve having a fourth inlet, a fourth outlet, a first inlet-outlet, a second inlet-outlet, means selectively actuable to one position for connecting said fourth inlet with said first inlet-outlet and said fourth outlet with said second inlet-outlet and to a second position for connecting said fourth inlet with said second inlet-outlet and said fourth outlet with said first inlet-outlet, third fluid passage means connecting said hydraulic output from said reciprocating means to said fourth inlet and said hydraulic return of said reciprocating means to said fourth outlet, fourth fluid passage means connecting said first inlet-outlet to said cylinder at one side of said piston, and fifth fluid passage means connecting said second inlet-outlet to said cylinder at the opposite side of said piston.

18. A tool assembly operable from a main source of air pressure comprising: a tool having a drive piston mounted in a cylinder for reciprocation in response to intensified hydraulic pressure in said cylinder on opposite sides of said drive piston; and a hydraulic power supply operable from the main source of air pressure and comprising reciprocating means actuable in response to the main source of air pressure for providing said intensified hydraulic pressure, said reciprocating means including a work piston, air directional valve means having an air input and operable for applying air alternately to opposite sides of said work piston for reciprocating said work piston a plurality of times for each stroke of said drive piston, and a hydraulic piston secured to said work piston for providing said intensified hydraulic pressure, a hydraulic output circuit for transmitting said intensified hydraulic pressure, and a hydraulic return circuit for returning low pressure fluid to be pressurized, an air throttle valve having a first inlet, a first outlet, and a first fluid path connecting said first inlet and first outlet, and first means in said first fluid path selectively actuable to one condition for opening said first fluid path and to another condition for closing said first fluid path, a bleed valve having a second and a third inlet, a second and a third outlet, a second fluid path connecting said second inlet and said second outlet, a third fluid path connecting said second inlet and said third outlet, and second means actuable responsively to air pressure from the main source at said third inlet for opening said third fluid path and with the air pressure from the main source removed from said third inlet actuable responsively to air pressure from the main source at said second inlet for closing said third fluid path, first fluid passage means for connecting said second outlet to said first inlet and for connecting said first outlet to said third inlet, second fluid passage means for connecting said second inlet to the main source, third fluid passage means for connecting said third outlet to said air input of said reciprocating means, said bleed valve including delay means for maintaining said third fluid path open for a preselected time interval after placing said air throttle valve into said other condition from said one condition whereby air pressure from the main source is maintained at said reciprocating means for said preselected time interval, said delay means including an enclosed chamber, said second means located in said chamber, an orifice communicating said chamber with the atmosphere, means for selectively changing the size of said orifice for regulating the rate of air flow from said chamber with said second means being held from closing said third fluid path until the pressure in said chamber drops to a preselected magnitude, a hydraulic throttle valve having a fourth inlet, a fourth outlet, a first inlet-outlet, a second inlet-outlet, and means selectively actuable to one position for connecting said fourth inlet with said first inlet-outlet and said fourth outlet with said second inlet-outlet and to a second position for connecting said fourth inlet with said second inlet-outlet and said fourth outlet with said first inlet-outlet, and third fluid passage means connecting said hydraulic outlet circuit from said reciprocating means to said fourth inlet and said hydraulic return circuit of said reciprocating means to said fourth outlet, fourth fluid passage means connecting said first inlet-outlet to said cylinder at one side of said drive piston, and fifth fluid passage means connecting said second inlet-outlet to said cylinder at the opposite side of said drive piston.

19. A tool assembly operable from a main source of air pressure comprising: a tool having a drive piston mounted in a cylinder for reciprocation in response to intensified hydraulic pressure in said cylinder on opposite sides of said drive piston; and a hydraulic power supply operable from the main source of air pressure and comprising reciprocating means actuable in response to the main source of air pressure for providing said intensified hydraulic pressure, said reciprocating means including a pair of pistons connected together with a common rod structure, air directional valve means having an air input and operable for applying air alternately to opposite sides of said pair of pistons for reciprocating said pair of pistons a plurality of times for each stroke of said drive piston, a single piston supported on said rod intermediate said pair of pistons for providing said intensified hydraulic pressure as it is reciprocated by said pair of pistons, a hydraulic output circuit for transmitting said intensified hydraulic pressure, and a hydraulic return circuit for returning low pressure fluid to be pressurized, an air throttle valve having a first inlet, a first outlet, and a first fluid path connecting said first inlet and first outlet, and first means in said first fluid path selectively actuable to one condition for opening said first fluid path and to another condition for closing said first fluid path, a bleed valve having a second and a third inlet, a second and a third outlet, a second fluid path connecting said second inlet and said second outlet, a third fluid path connecting said second inlet and said third outlet, and second means actuable responsively to air pressure from the main source at said third inlet for opening said third fluid path and with the air pressure from the main source removed from said third inlet actuable responsively to air pressure from the main source at said second inlet for closing said third fluid path, first fluid passage means for connecting said second outlet to said first inlet and for connecting said first outlet to said third inlet, second fluid passage means for connecting said second inlet to the main source, third fluid passage means for connecting said third outlet to said air input of said reciprocating means, said bleed valve including delay means for maintaining said third fluid path open for a preselected time interval after placing said air throttle valve into said other condition from said one condition whereby air pressure from the main source is maintained at said reciprocating means for said preselected time interval, said delay means including an enclosed chamber, said second means located in said chamber, an orifice communicating said chamber with the atmosphere, means for selectively changing the size of said orifice for regulating the rate of air flow from said chamber with said second means being held from closing said third fluid path until the pressure in said chamber drops to a preselected magnitude, a hydraulic throttle valve having a fourth inlet, a fourth outlet, a first inlet-outlet, a second inlet-outlet, and means selectively actuable to one position for connecting said fourth inlet with said first inlet-outlet and said fourth outlet with said second inlet-outlet and to a second position for connecting said fourth inlet with said second inlet-outlet and said fourth outlet with said first inlet-outlet, and third fluid passage means connecting said hydraulic output circuit from said reciprocating means to said fourth inlet and said hydraulic return circuit of said reciprocating means to said fourth outlet, fourth fluid passage means connecting said first inlet-outlet to said cylinder at one side of said drive piston, and fifth fluid passage means connecting said second inlet-outlet to said cylinder at the opposite side of said drive piston.

20. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a work piston and means for reciprocating said work piston a plurality of times for each stroke of said drive piston, actuating means selectively operable in one condition for connecting the main source of fluid pressure to said reciprocating means and in another condition for disconnecting the main source of fluid pressure from said reciprocating means, and means for connecting said reciprocating means for transmitting said intensified fluid pressure to said cylinder alternately on said opposite sides of said drive piston, said drive piston being movable in one direction from a selected position for doing work and in an opposite direction to said selected position, said last named means including means for automatically moving said drive piston to said selected position after termination of movement of said drive piston in said one direction.

21. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a work piston and means for reciprocating said work pis- ton a plurality of times for each stroke of said drive piston, actuating means selectively operable in one condition for connecting the main source of fluid pressure to said reciprocating means and in another condition for disconnecting the main source of fluid pressure from said reciprocating means, and means for connecting said reciprocating means for transmitting said intensified fluid pressure to said cylinder alternately on said opposite sides of said drive piston, said last named means including trigger means located on said tool and being actuable to one position for transmitting said intensified fluid pressure to said cylinder and at one side of said drive piston and to another position for transmitting said intensified fluid pressure to said cylinder and at the other side of said drive piston.

22. A tool assembly operable from a main source of fluid pressure comprising: a tool having a drive piston mounted in a cylinder for reciprocation in response to intensified fluid pressure in said cylinder on opposite sides of said drive piston; and power supply means connectible to the main source of fluid pressure for providing said intensified fluid pressure, said power supply means comprising reciprocating means actuable in response to the main source of fluid pressure for providing said intensified fluid pressure, said reciprocating means including a work piston and means for reciprocating said work piston a plurality of times for each stroke of said drive piston, actuating means selectively operable in one condition for connecting the main source of fluid pressure to said reciprocating means and in another condition for disconnecting the main source of fluid pressure from said reciprocating means, and means for connecting said reciprocating means for transmitting said intensified fluid pressure to said cylinder alternately on said opposite sides of said drive piston, said drive piston being movable in one direction from a selected position for doing work and in an opposite direction to said selected position, said last named means including means for automatically moving said drive piston to said selected position after termination of movement of said drive piston in said one direction, and trigger means located on said tool and being actuable to one position for transmitting said intensified fluid pressure to said cylinder for moving said drive piston in said one direction and actuable to another position for transmitting said intensified fluid pressure to said cylinder for moving said drive piston in said opposite direction.

References Cited by the Examiner
UNITED STATES PATENTS

| | | | |
|---|---|---|---|
| 1,081,020 | 12/1913 | Coyne | 103—52 |
| 2,336,446 | 12/1943 | Tucker et al. | 103—52 |
| 2,938,347 | 5/1960 | Sturgis | 60—51 |

EDGAR W. GEOGHEGAN, *Primary Examiner.*